May 7, 1957  J. J. RICHARD  2,791,474
BEARING TAKEUP
Filed Jan. 20, 1955  2 Sheets-Sheet 2
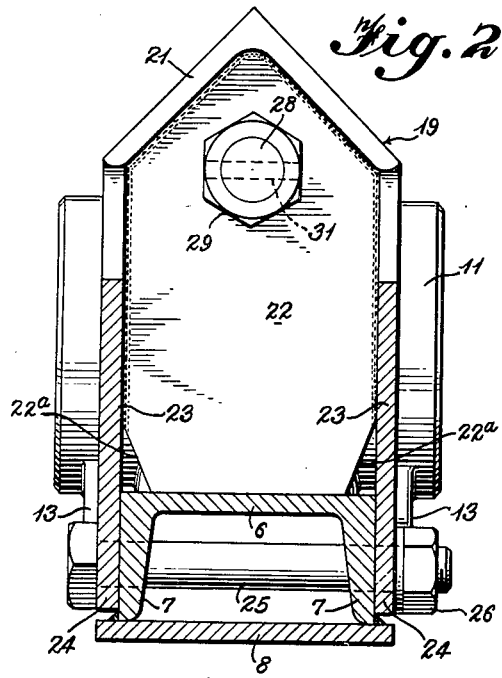
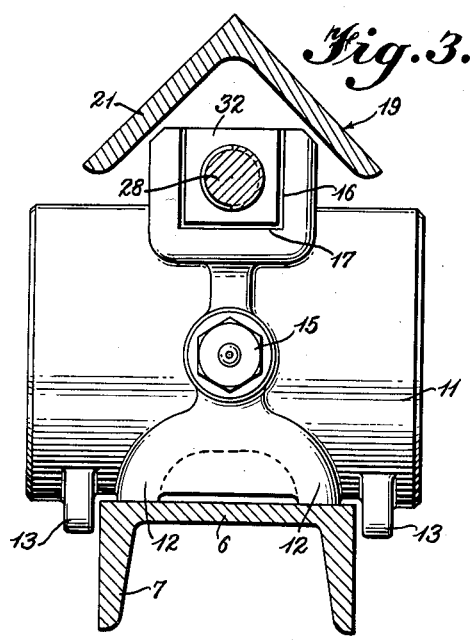
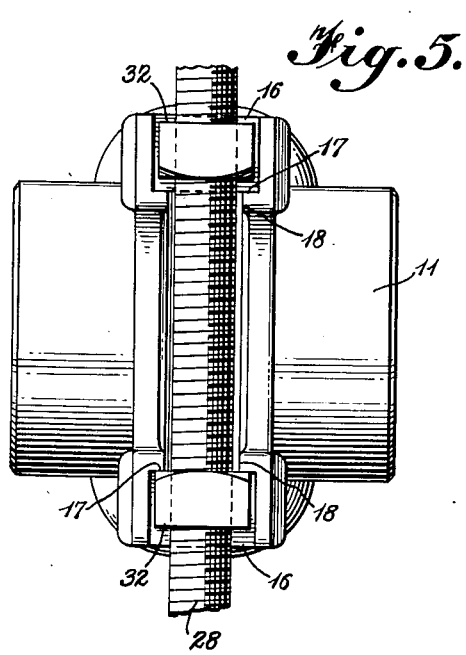
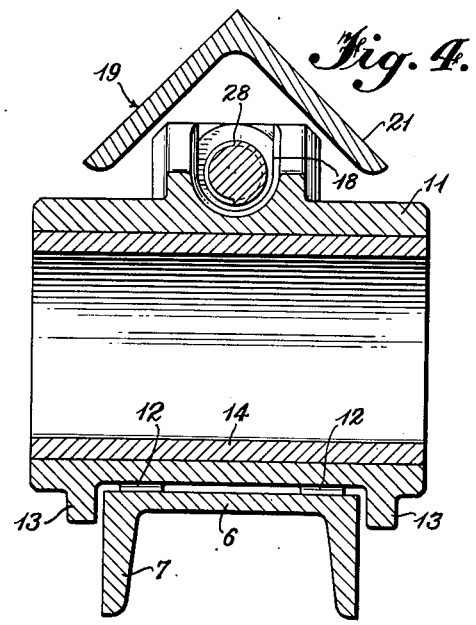

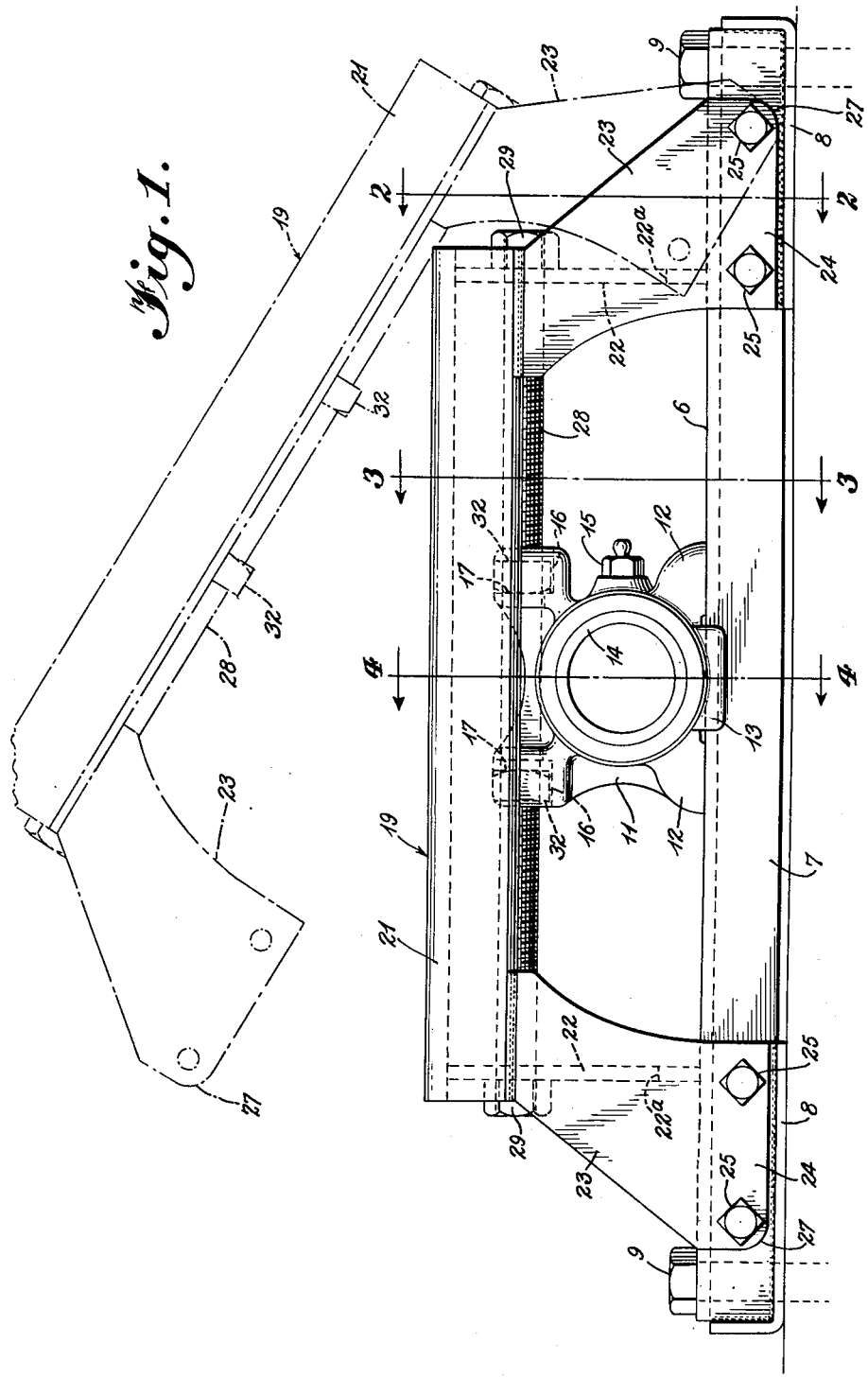

United States Patent Office 2,791,474
Patented May 7, 1957

2,791,474

BEARING TAKEUP

Joseph J. Richard, Chicago, Ill., assignor to Link-Belt Company, a corporation of Illinois Application January 20, 1955, Serial No. 482,962

5 Claims. (Cl. 308—59)

This invention relates to new and useful improvements in apparatus for mounting bearings and deals more particularly with takeups each of which comprises a base, a takeup screw, a cover assembly and a bearing block.

It is conventional practice to mount the head or tail shaft of conveyors for adjustment to maintain proper tension in the chain or belt employed. In those installations where the required movement of the head or tail shaft is not too great, the bearing blocks supporting the shaft are slidably supported on bases and held in the desired location by one or more takeup screws which may be rotated to effect movement of the blocks along the bases. Each takeup frame, provided by the base, cover assembly and takeup screw, must be strong and durable to withstand the operating conditions to which it is subjected. On the other hand, it is very desirable that the bearing blocks be demountable from the frames for replacement or repair with a minimum loss of operating time.

It is the primary object of this invention to provide a takeup frame that is stronger and more durable than prior types of takeup frames and which is so assembled to greatly facilitate the removal of the bearing blocks associated therewith.

A further important object of the invention is to provide a takeup frame having its takeup screw carried by the cover assembly for positioning and holding a bearing block in association with its base portion, the base portion and cover assembly with its associated screw being pivotally movable relative to each other to permit disassociation of the block from the frame.

Still another important object of the invention is to provide a takeup having a base portion and a takeup screw carried by a cover assembly for association with a bearing block, the base portion and cover assembly with its associated screw being so connected as to provide a rigid and durable frame structure which can be easily and quickly disassembled for removal and repair of the block.

Other objects and advantages of the invention will be apparent during the course of the following description.

In the accompanying drawings forming a part of this specification and in which like reference characters are employed to designate like parts throughout the same, Figure 1 is a side elevational view of a takeup embodying the invention, Figure 2 is a vertical sectional view taken on line 2—2 of Fig. 1, Figure 3 is a vertical sectional view taken on line 3—3 of Fig. 1, Figure 4 is a vertical sectional view taken on line 4—4 of Fig. 1, and Figure 5 is a top plan view of the bearing block and the associated portion of the takeup screw with the cover plate not illustrated.

In the drawings, wherein for the purpose of illustration is shown the preferred embodiment of the invention, reference character 6 designates a base plate formed of an inverted channel member to provide depending side flanges 7. Mounting pads 8 are welded, or otherwise suitably connected, to the bottom edges of the side flanges 7 at each end portion of the base plate 6 and are bent upwardly across the ends of the channel formed by the side flanges and the upper portion of the base plate. Vertically aligned openings are formed through the base plate 6 and mounting pads 8 at each end portion of the base plate for receiving the studs or bolts 9 by means of which the takeup may be mounted on a suitable supporting structure.

Resting on the upper surface of the base plate 6 is a bearing block 11 which is provided with legs 12 for slidably supporting the block on the upper surface of the base plate and depending lugs 13 which project downwardly along the outer faces of the opposite side flanges 7 to restrict movement of the block to either longitudinal direction along the base plate. The block 11 has mounted therein a sleeve bearing 14 the axis of which is arranged to extend transversely of the base plate 6. A grease fitting 15 may be provided for introducing lubricant to the bearing 14. The two upper corners of the block 11 are provided with pockets 16, each one of which is formed by two side walls and an inner end wall. The end walls of the two pockets function as abutments 17 facing in opposite longitudinal directions and are provided with longitudinally aligned, vertically opening notches 18. The top and outer end of each pocket are left open for a purpose that will be later described.

Connected to the opposite end portions of the base plate 6 and spanning the intermediate portion of the latter in spaced parallel relationship therewith outwardly of the bearing block 11 is a cover assembly designated in its entirety by the reference character 19. This assembly 19 includes a cover plate 21 formed so that each side thereof slopes downwardly from the longitudinal centerline to the side edge of the plate. Arranged in normal relationship with the cover plate 21 and base plate 6 at each end portion of the cover plate is an end wall 22 the top edge of which is angularly shaped and welded to the inner face of the cover plate. The bottom edge of this end wall terminates at the base plate. The corners formed at the junction of the side and bottom edges of the end walls 22 are cut off at 22a for a purpose that will be later described and the remaining portions of the side edges are in substantially vertical alignment with the outer faces of the side flanges 7 of the base plate 6.

Side plates 23 are welded to the portions of the opposite side edges of the end walls 22 above the cut off at 22a and to adjacent portions of the opposite side edges of the cover plate 21. Each end wall 22, therefore, is provided with a pair of side plates 23 and the longitudinally outer edge portions of each pair are inclined downwardly and outwardly from the end of the cover plate 21 to the base plate 6. The longitudinally inner edges of each pair of side plates 23 are inclined arcuately downwardly and outwardly from their associated edges of the cover plate 21 to the base plate 6. Each side plate 23 is provided with a depending portion 24 which projects downwardly past the bottom edge of its associated end wall 22 and lies along the outer face of the adjacent side flange 7. The cutoff at 22a adjacent each depending portion 24 will permit the depending portions to be positioned along the outer faces of the side flanges 7 irrespective of irregularities in the side flanges and the depending portions.

The depending portions 24 of the side plates 23 are detachably secured to the base plate 6 by bolts 25 which extend through transversely aligned openings in the depending portions and in the side flanges 7 of the base plate. The bolts 25 are secured in their associated aligned openings by nuts 26 which are positioned where they are easily accessible to permit removal of the bolts and detachment of the depending portions 24 from the base plate 6. The lower and longitudinally outer corner of each side plate 23 is rounded at 27 so that the cover assembly 19 may be pivoted about the outermost bolt 25 at either end of the base plate 6 when the remaining bolts are removed from their aligned openings in the depending portions 24 and flanges 7.

Journaled in the end walls 22 and extending axially through the aligned notches 18 in the abutments 17 of the bearing block 11 is a takeup screw 28, the opposite end portions of which are provided with nuts 29 which are fastened to the screw by pins 31, as best illustrated in Fig. 2. Rotation of the nut 29 at either end of the screw 28, therefore, will effect rotation of the screw.

Threaded onto the screw 28 with a slightly greater spacing therebetween than the spacing between the abutments 17 are a pair of square nuts 32 which are fitted into the pockets 16 and are held against rotation by engagement with the side walls of said pockets. It will be readily apparent, therefore, that rotation of the takeup screw 28 will effect longitudinal movement of the nuts 32 in a direction to cause one of the nuts to engage its associated abutment 17 so as to effect longitudinal movement of the bearing block 11. The clearance between one of the nuts 32 and its associated abutment 17 will permit pivotal movement of the cover assembly 19 to remove the nuts from the pockets 16 so that the bearing block 11 is readily accessible for replacement or repair.

It is to be understood that the form of the invention herewith shown and described is to be taken as the preferred example of the same, and that various changes in the shape, size and arrangement of parts may be resorted to without departing from the spirit of the invention or the scope of subjoined claims.

Having thus described the invention, I claim:

1. A bearing takeup, comprising a base plate, a bearing block supported for longitudinal movement on said base plate, a cover assembly providing a cover plate, a pair of spaced end walls arranged in normal relationship with and welded at their top edges to said cover plate, and a pair of side plates welded to the opposite side edges of each end wall and at their top edges to adjacent portions of the side edges of the cover plate, an adjusting screw journaled in said end walls, and means carried by said screw for separably engaging said bearing block to hold the latter in an adjusted position on the base plate and to move the block when the screw is rotated; and means detachably securing said side plates to said base plate to hold said block engaging means in operative relationship with said block, said securing means being partially detachable to permit pivotal movement of said cover assembly relative to said base plate to release said block engaging means from operative relationship with said block to permit removal of the block from the base plate.

2. A bearing takeup as specified in claim 1 further characterized by the side plates of each pair having projecting portions which are arranged on opposite sides of said base plate and are connected thereto by said securing means, said projecting portions of the two pairs of side plates being longitudinally offset in opposite directions relative to their welded connections to the edge portions of the cover plate.

3. A bearing takeup as specified in claim 2 further characterized by said securing means comprising bolts extending through aligned transverse openings in said base plate and the projecting portions of said side plates, and means for retaining said bolts in the openings, said cover assembly being pivotally movable about one of said bolts when the remaining bolts are removed.

4. A bearing takeup of the type described, comprising a base plate, a bearing block supported for longitudinal movement on said base plate, a pair of end walls positioned adjacent opposite end portions of said base plate, a cover plate extending between and welded to the top edges of said end walls outwardly of said bearing block, a pair of side plates welded to the opposite side edges of each end wall and at their side edges to the adjacent portions of the side edges of the cover plate, each of said pairs of side plates extending angularly between the cover plate and the base plate and having depending portions adjacent opposite sides of the base plate, a takeup screw journaled in said end walls, means carried by said takeup screw for separably engaging said bearing block to retain the latter on the base plate and to effect longitudinal movement of the block when the takeup screw is rotated, and means detachably securing the depending portions of the side plates to the sides of said base plates at a plurality of spaced points to permit said side plates, end walls, cover plate, takeup screw and engaging means to be separated as a unit from said base plate and the bearing block when all of the securing means are detached to permit removal of the block from the base plate.

5. A bearing takeup as specified in claim 4 further characterized by said securing means comprising bolts extending through aligned transverse openings in the base plate and the depending portions of the side plates, and nuts threaded onto said bolts to retain the latter in their openings, said side plate, end walls, cover plate, takeup screw and engaging means being pivotally movable relative to the base plate about at least one of the bolts at either end portion of the base plate when the other bolts are removed.

References Cited in the file of this patent

UNITED STATES PATENTS 1,778,231     Sjolander               Oct. 14, 1930